(12) United States Patent
Nishijima et al.

(10) Patent No.: US 7,907,978 B2
(45) Date of Patent: Mar. 15, 2011

(54) MOBILE TERMINAL

(75) Inventors: Katsumi Nishijima, Tokyo (JP); Akiko Shishido, Tokyo (JP); Michio Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 10/814,188

(22) Filed: Apr. 1, 2004

(65) Prior Publication Data
US 2005/0079897 A1 Apr. 14, 2005

(30) Foreign Application Priority Data

Apr. 9, 2003 (JP) ................................. 2003-104710

(51) Int. Cl.
*H04M 1/00* (2006.01)
*H04M 9/00* (2006.01)
*H04B 1/38* (2006.01)

(52) U.S. Cl. .................. 455/575.1; 455/575.3; 455/566; 379/428.01

(58) Field of Classification Search .................. 455/566, 455/575.1, 575.3, 410, 411, 575.8, 90.3, 455/575.4, 450, 451, 452.1, 452.2, 453; 370/395.21, 370/395.3, 395.31, 395.32, 395.4, 395.41, 370/395.42, 395.43; 379/428.01
See application file for complete search history.

(56) References Cited

U.S. PATENT DOCUMENTS

| | | | |
|---|---|---|---|
| 6,088,585 A * | 7/2000 | Schmitt et al. ................ 455/411 |
| 6,215,474 B1 | 4/2001 | Shah | |
| 6,549,789 B1 * | 4/2003 | Kfoury ...................... 455/550.1 |
| 6,621,066 B2 * | 9/2003 | Kim ............................. 250/221 |
| 6,957,083 B2 * | 10/2005 | Ikeda et al. ................ 455/556.1 |
| 7,031,759 B2 * | 4/2006 | Wong et al. ................ 455/575.1 |
| 7,146,197 B2 * | 12/2006 | Kang et al. ................. 455/575.1 |
| 2001/0004269 A1 | 6/2001 | Shibata | |
| 2003/0013417 A1 * | 1/2003 | Bum ............................. 455/90 |
| 2003/0064758 A1 * | 4/2003 | Mizuta et al. ............... 455/566 |
| 2003/0174240 A1 * | 9/2003 | Wada et al. .................. 348/374 |
| 2003/0228881 A1 * | 12/2003 | Yamamoto et al. ........ 455/550.1 |
| 2004/0192422 A1 * | 9/2004 | Watanabe et al. .......... 455/575.3 |
| 2004/0198435 A1 * | 10/2004 | Gauld et al. ............... 455/556.1 |
| 2004/0203532 A1 * | 10/2004 | Mizuta ........................ 455/90.3 |
| 2004/0204203 A1 * | 10/2004 | Lee ............................ 455/575.1 |
| 2004/0219957 A1 * | 11/2004 | Nishijima et al. ......... 455/575.3 |
| 2005/0104955 A1 * | 5/2005 | Navntoft .................... 348/14.02 |

(Continued)

FOREIGN PATENT DOCUMENTS

CN 1388694 A 1/2003

(Continued)

OTHER PUBLICATIONS

European Search Report of Oct. 14, 2009.

*Primary Examiner* — Andrew Wendell
(74) *Attorney, Agent, or Firm* — Young & Thompson (57) ABSTRACT

A folding mobile telephone includes a 2-axis hinge unit. The end portion of the 2-axis hinge unit is constantly exposed outside the mobile telephone. The exposed portion includes input elements. The input elements can be, for example, a pointing device. The pointing device can be operated regardless of the positions of the housings of the communications terminal. The telephone includes position detection elements for detecting the relative positions of the housings. The control unit can control the operation of the terminal based on the relative positions of the housings. The position detection elements includes a magnet and a magnetic sensor. The input elements can be a fingerprint sensor.

24 Claims, 9 Drawing Sheets

U.S. PATENT DOCUMENTS

| | | | |
|---|---|---|---|
| 2006/0063570 A1* | 3/2006 | Nishimura | 455/575.3 |
| 2006/0154702 A1* | 7/2006 | Kang et al. | 455/575.3 |

FOREIGN PATENT DOCUMENTS

| | | |
|---|---|---|
| EP | 0 872 993 | 10/1998 |
| EP | 1 271 897 | 1/2003 |
| EP | 2003-018961 | 1/2003 |
| EP | 2003018261 | 1/2003 |
| EP | 2003-069676 | 3/2003 |
| EP | 2003069676 | 3/2003 |
| EP | 1 404 088 | 3/2004 |
| JP | 1-112319 | 5/1989 |
| JP | 11-30226 | 2/1999 |
| JP | 11-187098 | 7/1999 |
| JP | 2002-44189 | 2/2002 |
| JP | 2002-118633 | 4/2002 |
| JP | 2002-135380 | 5/2002 |
| JP | 2002-314657 | 10/2002 |
| JP | 2002-368870 | 12/2002 |
| JP | 2003-58302 | 2/2003 |
| WO | 02/13001 | 2/2002 |

* cited by examiner

MOBILE TERMINAL

BACKGROUND OF THE INVENTION

1. Field of the Invention

The present invention relates to a mobile terminal, and more specifically to a folding mobile terminal in which a 2-axis hinge unit rotatably couples two housings.

2. Description of the Related Art

A mobile telephone can be of a straight type, a folding type, etc. Since a folding mobile telephone can be provided with a large liquid crystal display unit, it is widely used by a large number of users. Conventionally, a majority of the mobile telephones of this type are designed to allow an upper housing having a display unit and a lower housing having an operation unit to be open and closed to each other. Japanese Patent Application Laid-open No. 11-30226, Japanese Patent Application Laid-open No. 2002-118633, etc. have disclosed a mobile telephone in which a 2-axis hinge unit rotatably couples two housings. With the mobile telephone of this type, an upper housing can be rotated and be folded. Therefore, when the mobile telephone is folded, the display unit can be arranged outside. However, the mobile telephone normally has its key operation unit in the lower housing. Therefore, although the folded mobile telephone has its display unit facing outside, it is not possible to operate the key operation unit in the lower housing. A pointing device occupies a large area of the key operation unit. However, since the upper housing is occupied by a large display unit, it is hard to arrange the pointing device in the upper housing.

SUMMARY OF THE INVENTION

The mobile terminal according to an embodiment of the present invention includes a control unit for controlling a terminal, a display unit, an upper housing, a lower housing, and a 2-axis hinge unit for coupling the housings. A part of the 2-axis hinge unit is exposed to the outside of the terminal, and input means is mounted in the exposed portion. The control unit can control the terminal by operating the input means. The input means can be, for example, a pointing device. The mobile terminal can include position detection means for detecting the relative positions between the upper housing and the lower housing. The control unit can control the terminal based on the output of the position detection means. The input means can be a fingerprint sensor. The control unit can control the terminal based in the input from the fingerprint sensor. The terminal can also include a lock unit for locking the 2-axis hinge unit. The lock unit can lock the folded terminal by the input of the fingerprint sensor. When the mobile terminal is folded, the mobile terminal can be controlled through the input means. Furthermore, predetermined operations such as a pointing operation on the display unit arranged on the surface of the folded terminal, etc. can be performed.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1A:
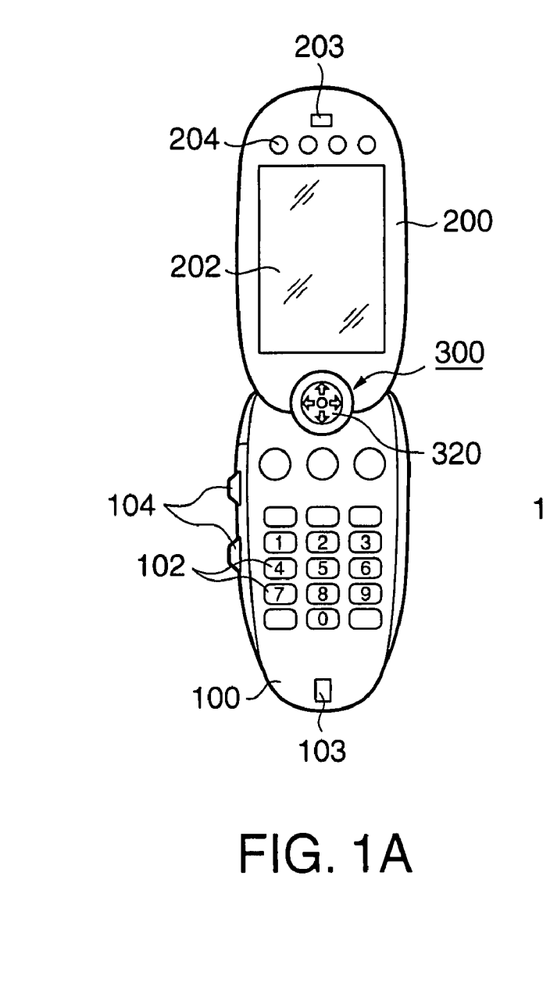
FIGS. 1A, 1B, and 1C are plan views according to an embodiment of the mobile terminal of the present invention.
Figure 1B:
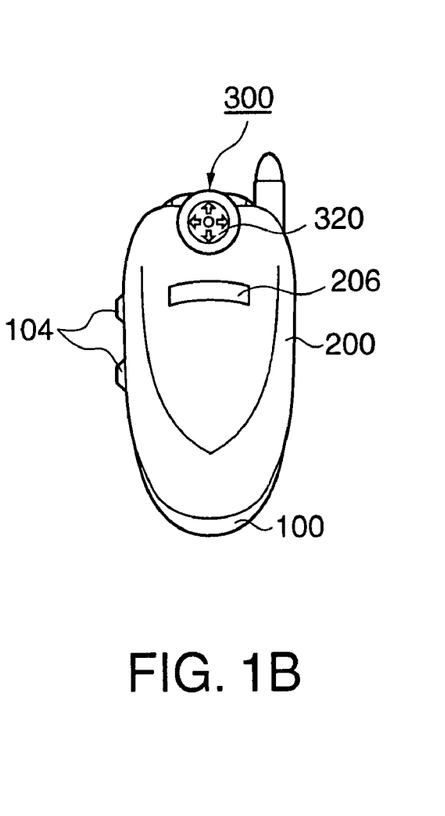
Figure 1C:
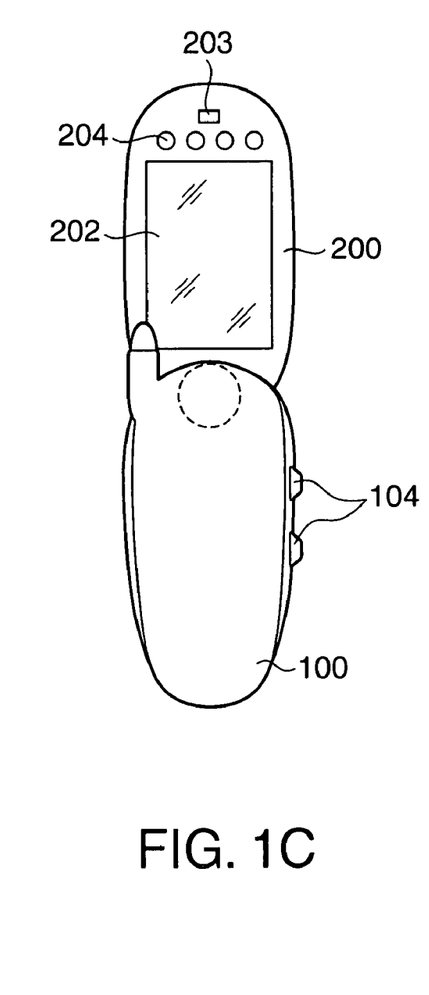
Figure 2A:
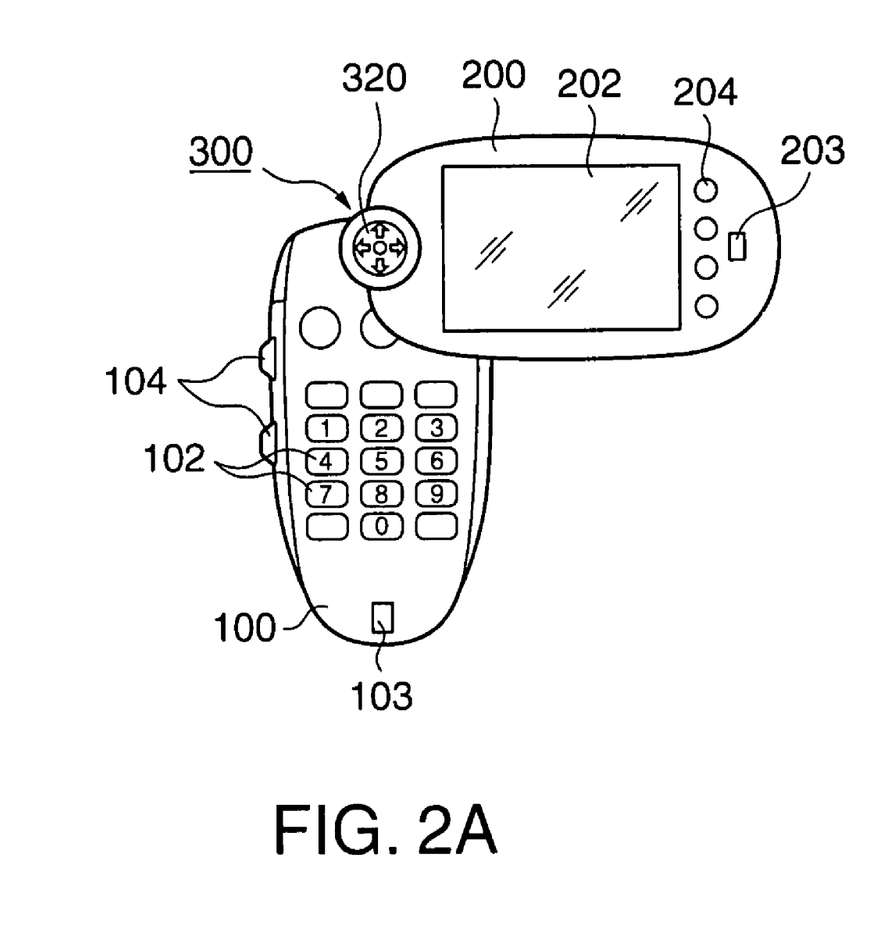
FIGS. 2A and 2B are plan views according to an embodiment of the mobile terminal of the present invention.
Figure 2B:
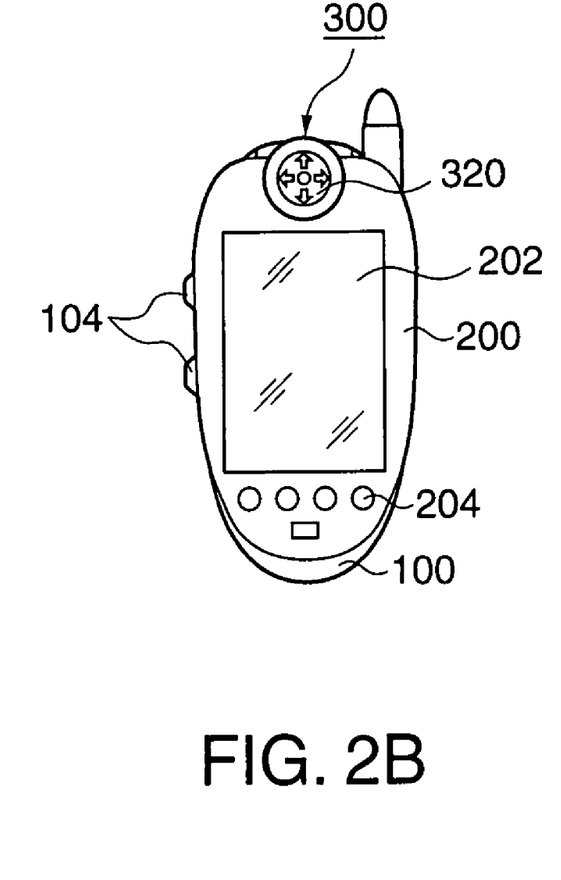

An example of a mobile telephone is described below as a folding mobile terminal according to the present invention. FIGS. 1A, 1B, 1C, 2A, and 2B show examples of arranging the upper housing and the lower housing on the 2-axis hinge unit. In FIG. 1A, an upper housing 200 including a display unit 202 is opened, and an operation key unit 102 and other units are arranged in the lower housing. FIG. 1B shows the closed upper housing 200 overlaid on a lower housing 100. FIG. 1C shows the case in which the upper housing 200 is 180° turned from the position shown in FIG. 1A. FIG. 2A shows the case in which the upper housing 200 is 90° turned from the position shown in FIG. 1A along the lower housing 100. FIG. 2B shows the case in which the upper housing 200 is further turned from the position shown in FIG. 2A, and overlaid on the lower housing 100.

The upper housing 200 of the mobile telephone of the above-mentioned example includes the display unit 202, an ancillary operation key 204, and a speaker 203. The lower housing 100 includes the operation key unit 102, a microphone 103, and a secondary operation key 104. A 2-axis hinge unit 300 couples these two housings. The two housings can be folded and be turned. A pointing device 320 is arranged at the end of the 2-axis hinge unit 300. The pointing device 320 is constantly exposed to the outside of the mobile telephone regardless of the position of the housings. The operations selected by the pointer on the display unit 202 can be performed by pressing the pointing device 320.

Figure 3:
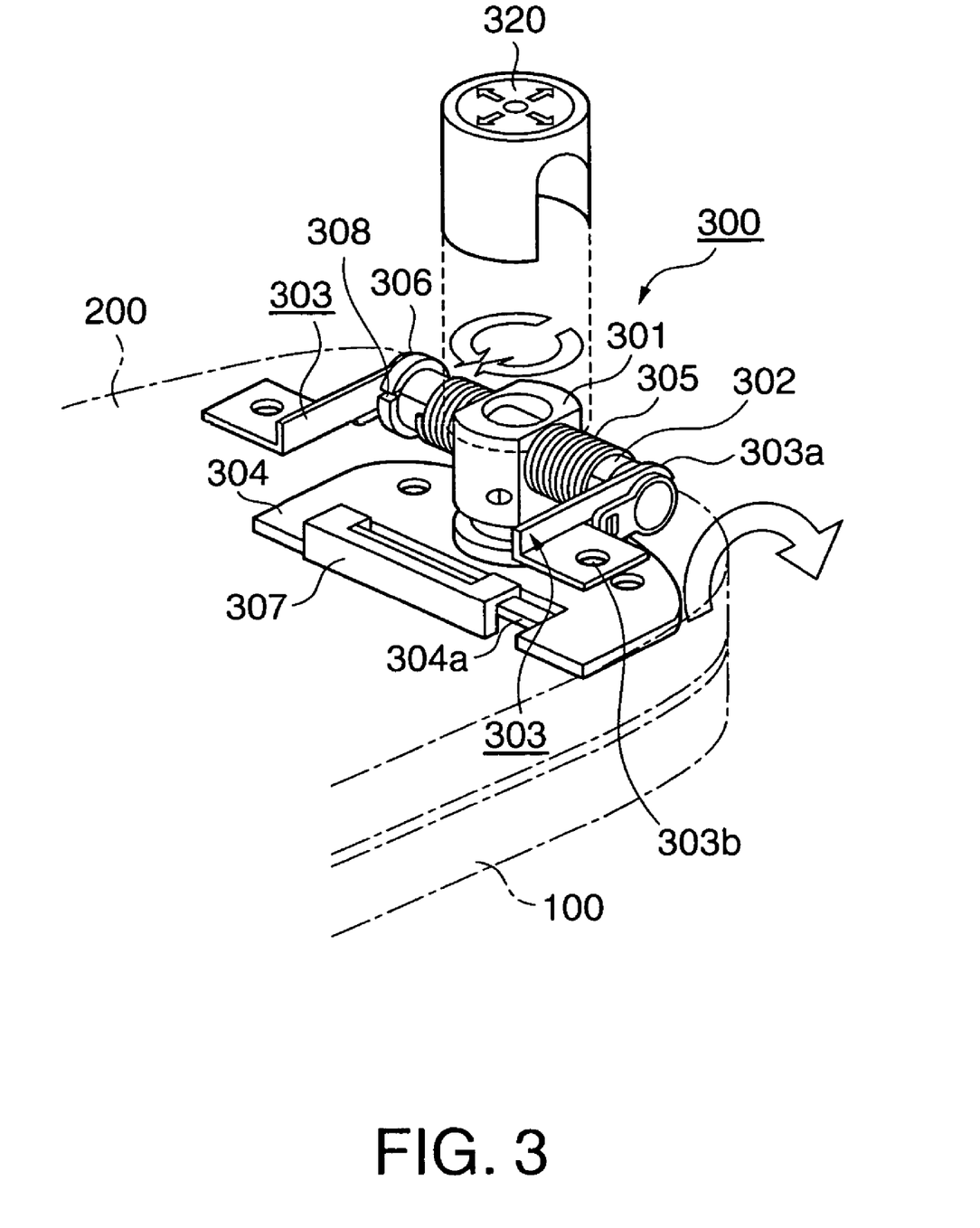
FIG. 3 is a perspective view showing an embodiment of the 2-axis hinge unit of the present invention.

FIG. 3 shows an embodiment of the 2-axis hinge unit. The 2-axis hinge unit 300 includes a first metal rotation axis (hereinafter referred to as a horizontal rotation axis) 301 and a second metal rotation axis (hereinafter referred to as an open/close rotation axis) 302. The open/close rotation axis 302 is arranged in the upper housing 200. The pointing device 320 is arranged at the end of the horizontal rotation axis 301. A metal substrate 304 holds the horizontal rotation axis 301. The lower portion of the horizontal rotation axis 301 and the substrate 304 are arranged in the lower housing 100. The open/close rotation axis 302 has two coil springs 305. Circular click plates 306 are attached to both ends of the open/close rotation axis 302. End portions 303a of a bracket unit 303 are connected to both ends of the open/close rotation axis 302. The bracket unit 303 has a through-hole 303b, and is fixed to the substrate 304 with a bolt.

The horizontal rotation axis 301 and the open/close rotation axis 302 are independently turned in a predetermined range. The horizontal rotation axis 301 turns within the range of ±180°. The open/close rotation axis 302 turns within the range from 0° to 180°. The turn is restricted by a stopper. Described below is the stopper mechanism of the horizontal rotation axis 301. The substrate 304 has a guide rod 304a. The guide rod 304a is provided with a stopper 307. The stopper 307 can slide along the guide rod 304a. The horizontal rotation axis 301 has a projection at the lower portion. The projection turns with the horizontal rotation axis 301. The projection touches the stopper 307, and the upper housing 200 stops. In another example, two projections can be formed. One projection is used for a clockwise turn, and the other for a counterclockwise turn. After the upper housing 200 turns by 90°, it is desired that the housing 200 is gently fixed. A stopper which gently fixes it can be arranged. The stopper mechanism (hereinafter referred to as a click mechanism) of the open/close rotation axis 302 is described below. When the upper housing 200 is coming close a predetermined open position or a predetermined closed position, the click mechanism generates a torque for these positions. The click mechanism also generates a torque for holding the upper housing 200 in these positions. The click mechanism according to the present embodiment includes the click plate 306 having a projection, a groove portion 308 formed in the bracket unit 303, and a coil spring 305 for generation of a torque for the click plate. The projection is formed outside the click plate 306. The bracket unit 303 has the groove portion 308 in its inner surface. The groove portion 308 is engaged with the projection on the click plate 306 in the predetermined positions. In the position of the groove portion 308, the upper housing 200 is temporarily fixed. The coil spring 305 pushes the click plate 306 against the bracket unit 303. The configuration of the 2-axis hinge unit is not limited to the configuration of the present embodiment.

The electrical connection between the upper housing and the lower housing if formed in a known method. For example, it is possible to arrange flexible wiring inside the horizontal rotation axis and the open/close rotation axis. Otherwise, a film of a flexible printed circuit (FPC) can be arranged around the rotation axes.

Figure 4A:
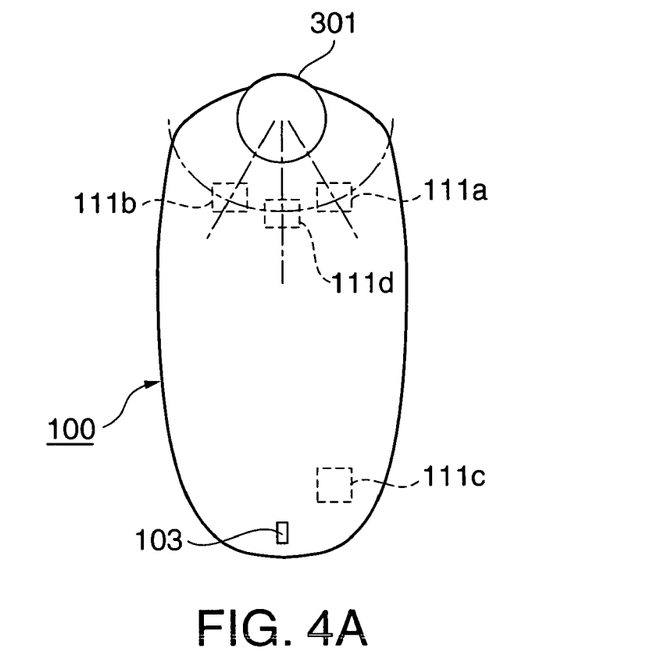
FIGS. 4A, 4B, and 4C are plan views showing the arrangement of the magnetic sensor and the magnet arranged on the mobile terminal of the present invention.
Figure 4B:
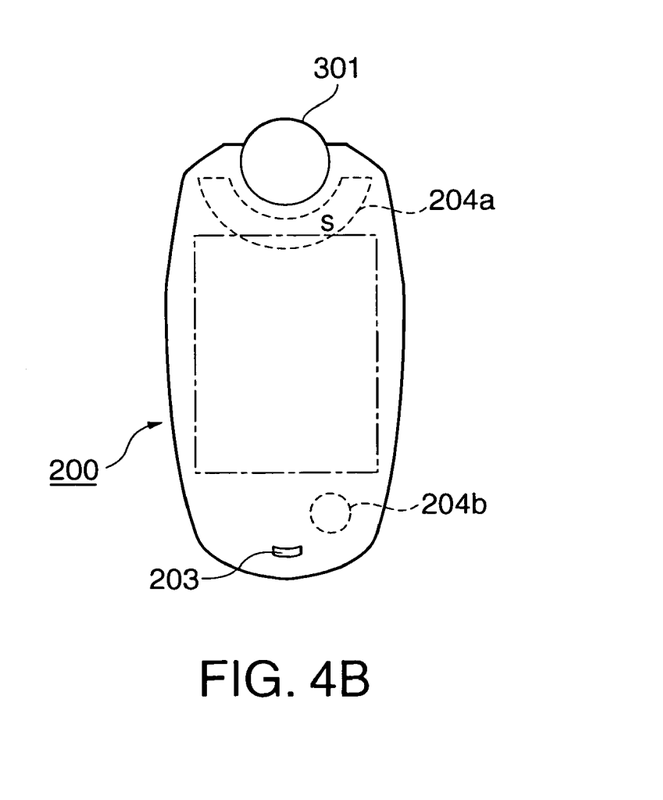
Figure 4C:
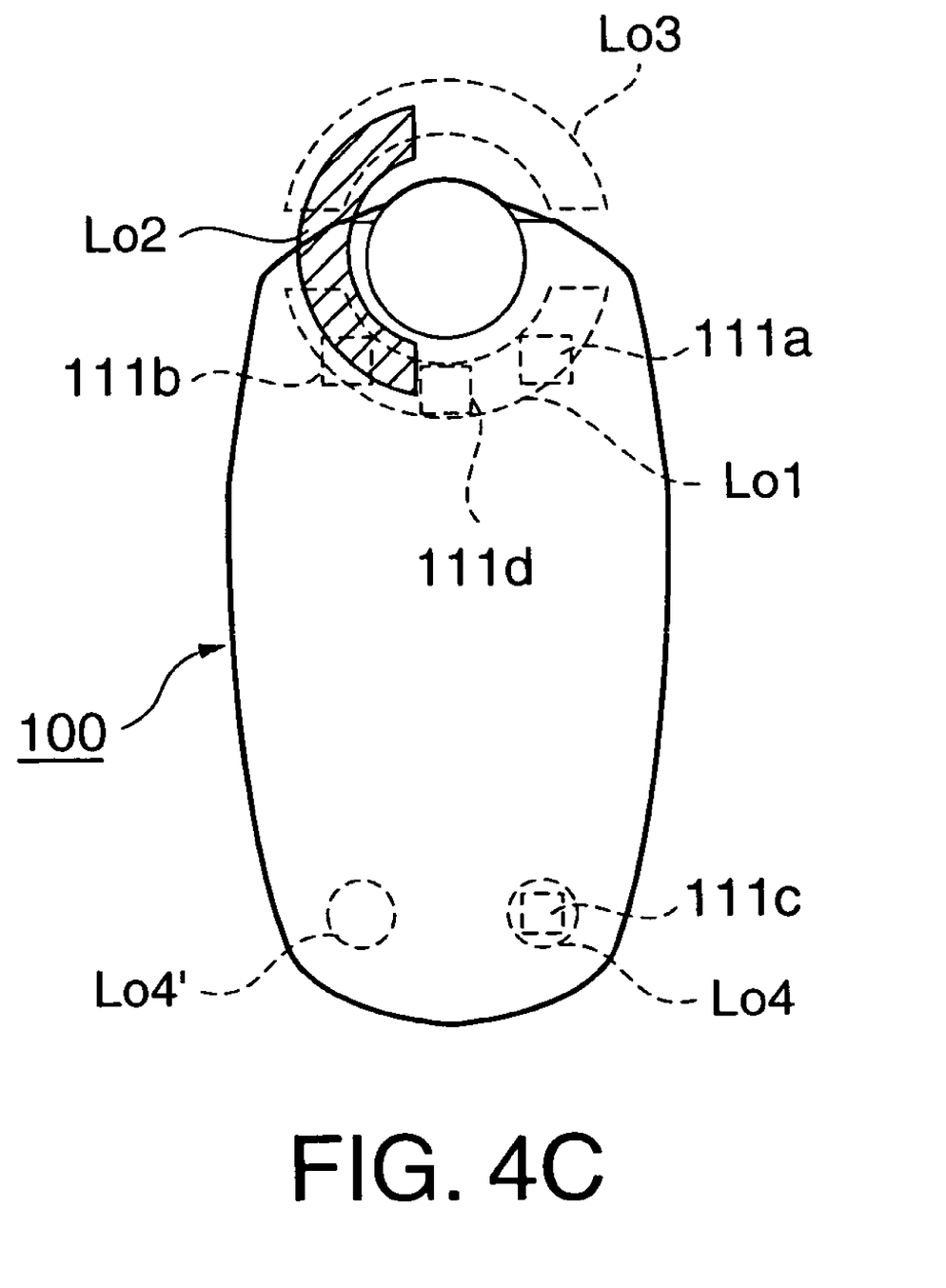

FIGS. 4A, 4B, and 4C show the mechanisms of detecting the relative positions between the upper housing 200 and the lower housing 100. In FIG. 4A, the lower housing 100 has four Hall element (magnetic sensors) 111a to 111d. The magnetic detection unit with the Hall element faces the surface of the lower housing 100 on which the operation key, etc. is arranged. The Hall elements 111a, 111b, and 111d are located on the arc of a predetermined radius centered on the horizontal rotation axis 301. The Hall device 111d is located on the center axis of the lower housing 100. The Hall elements 111a and 111b are located at the positions of a 45° from the center axis. Around the end portion of the lower housing, the Hall element 111c is arranged. Each of the above-mentioned Hall elements can detect the direction of the magnetic field of a magnet. In FIG. 4B, the upper housing 200 has a semicircular magnet 204a in the corresponding positions of the Hall elements 111a, 111b, and 111d. Around the end portion of the upper housing 200, a magnet 204b is mounted. The position of the magnet 204b corresponds to the position of the Hall element 111c. Three magnets can be arranged in the positions corresponding to the Hall elements 111a, 111b, and 111d. FIG. 4C shows an example of the relative position between the Hall element and the magnet. In this example, the upper housing 200 is parallel to the lower housing 100. When the upper housing 200 is folded and overlaid on the lower housing 100, the magnet 204a is located in the position Lo1. In this case, all of the Hall elements 111a, 111b, and 111d detect magnets. If the upper housing 200 turns clockwise by 90°, the magnet 204a is located in the position Lo2. In this case, only the Hall element 111b detects a magnet. If the upper housing 200 further turns clockwise by 90°, then the magnet 204a is located in the position Lo3. In this case, no Hall elements detect a magnet. As described above, the position of the upper housing can be determined based on the output of the Hall elements. When the upper housing 200 and the lower housing 100 are folded and the display unit 202 is arranged outside the telephone, the Hall element 111c is located in the position Lo4. In this case, the Hall element 111c detects the magnet 204b. When the upper housing 200 and the lower housing 100 are folded and the display unit 202 is arranged inside the telephone, the Hall element 111c is located in the position Lo4'. In this case, the Hall element 111c does not detect the magnet 204b. Therefore, when the housings are folded, the position of the display unit 202 is determined based on the output of the Hall element 111c.

Figure 5:
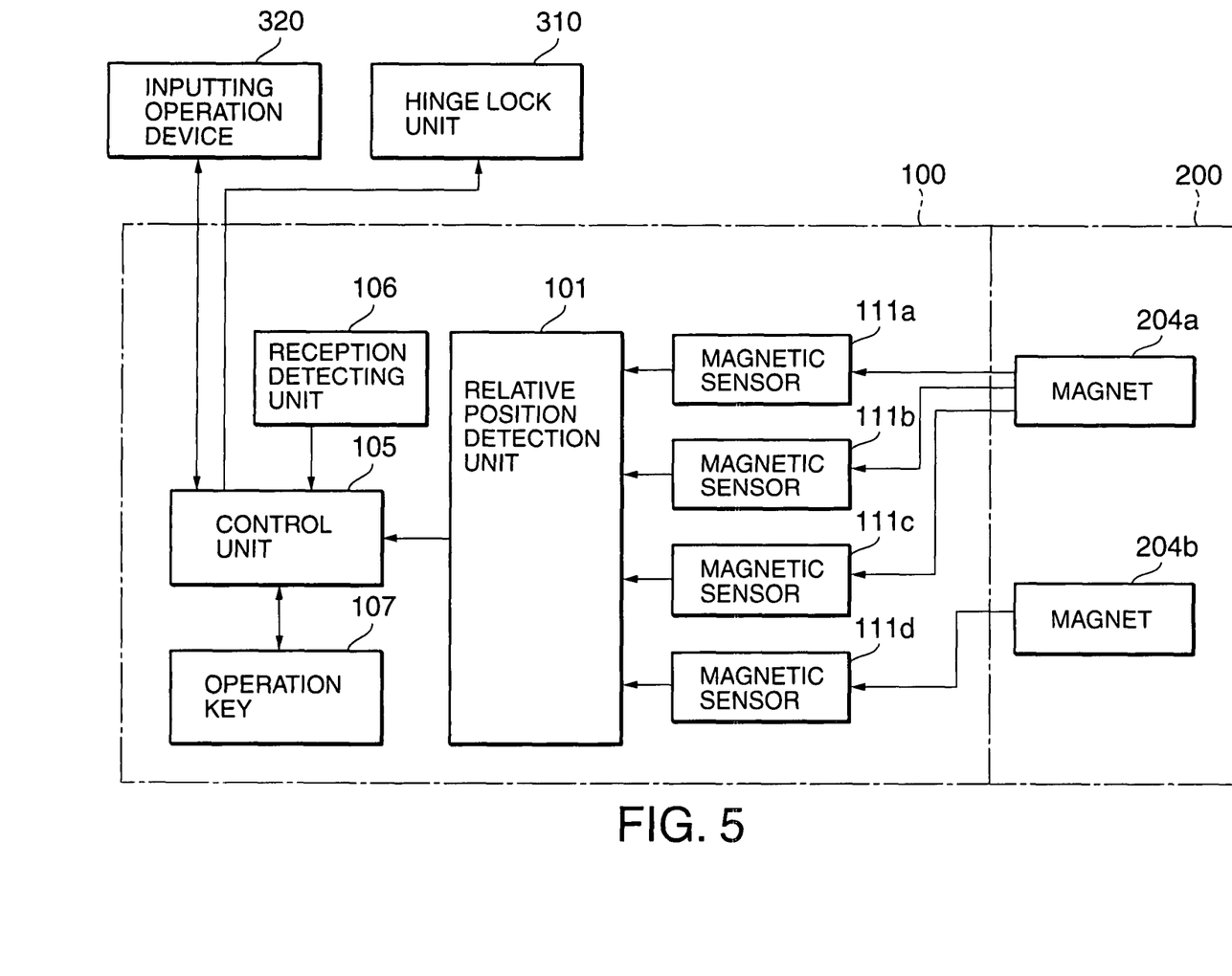
FIG. 5 is a block diagram showing an embodiment of the mobile terminal according to the present invention.

FIG. 5 is a block diagram showing an embodiment of the present invention. The upper housing 200 has the magnets 204a and 204b. The lower housing 100 has the Hall elements 111a to 111d. A relative position detection unit 101 detects the relative positions between the upper housing 200 and the lower housing 100 based on the outputs of the Hall elements 111a to 111d. The lower housing 100 has an operation key 107, a reception detecting unit 106, a hinge lock unit 310, and an inputting operation device (for example, a pointing device) 320. A control unit 105 controls the pointing device 320, the operation key 107, the hinge lock unit 310, and the entire telephone. The pointing device 320 can be used as an operation button (for example, a scroll button, a camera button, etc.).

The control unit 105 can enable or disable an inputting operation of the pointing device 320 based on the output of the relative position detection unit 101. For example, when the upper housing 200 and the lower housing 100 are folded and the display unit 202 is arranged inside the telephone, the control unit 105 can disable an inputting operation of the pointing device 320.

Figure 6:
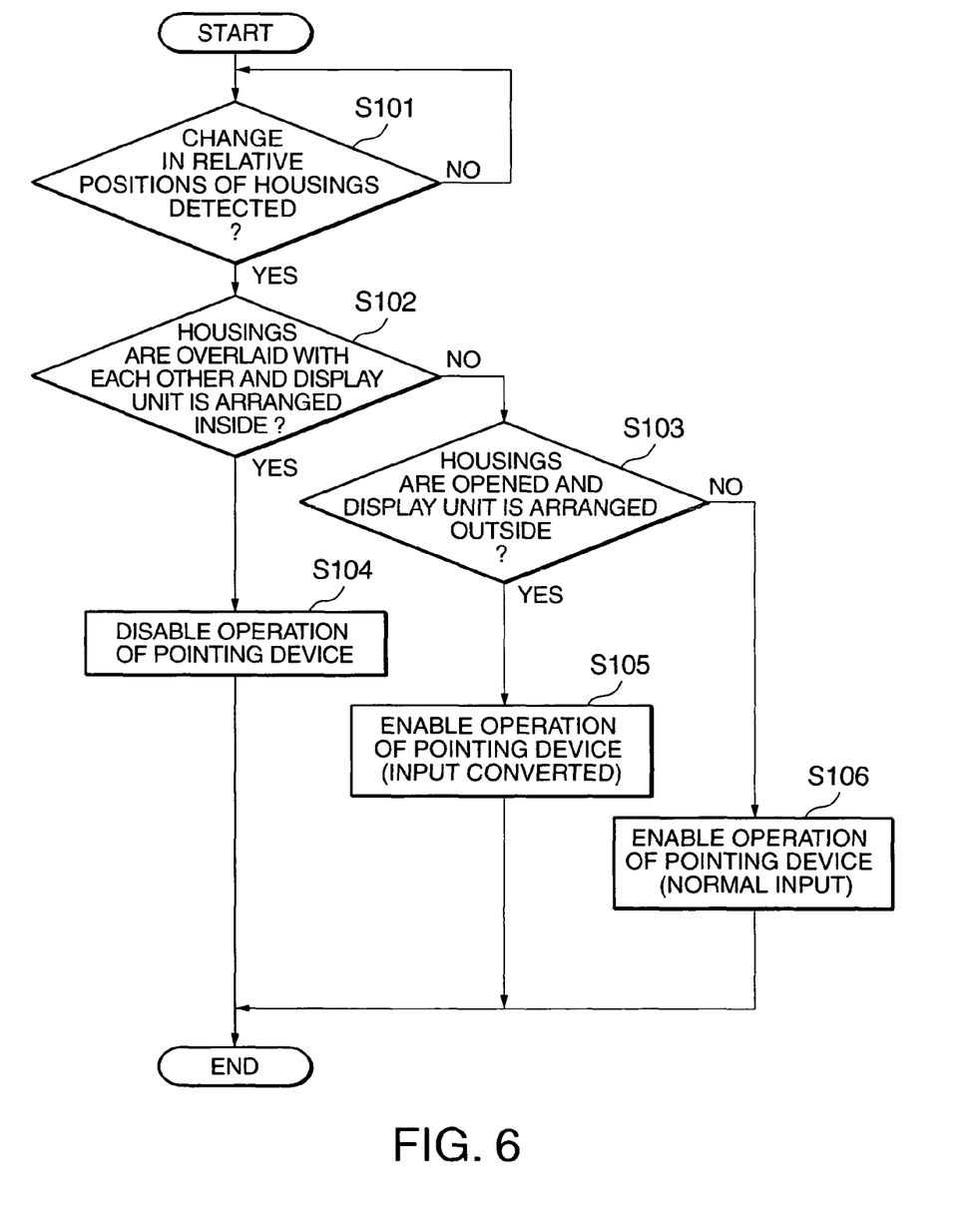
FIG. 6 is a flowchart showing an example of the operation of the mobile terminal according to the present invention.

FIG. 6 shows the above-mentioned control flow. First, the change in the relative positions of the housings is detected (S101). When the housings are overlaid with each other with the display unit 202 facing inside (YES in S102), the control unit 105 disables the inputting operation of the pointing device 320 (S104). When the housings are open (NO in S102), the control unit 105 determines whether or not the display unit 202 faces outside (S103). If the display unit 202 faces outside (YES in S103), the control unit 105 enables the inputting operation of the pointing device 320. At this time, the input of the pointing device 320 is converted left to right (S105). When the display unit 202 faces inside (NO in S103), the control unit 105 enables the inputting operation of the pointing device 320.

Figure 7:
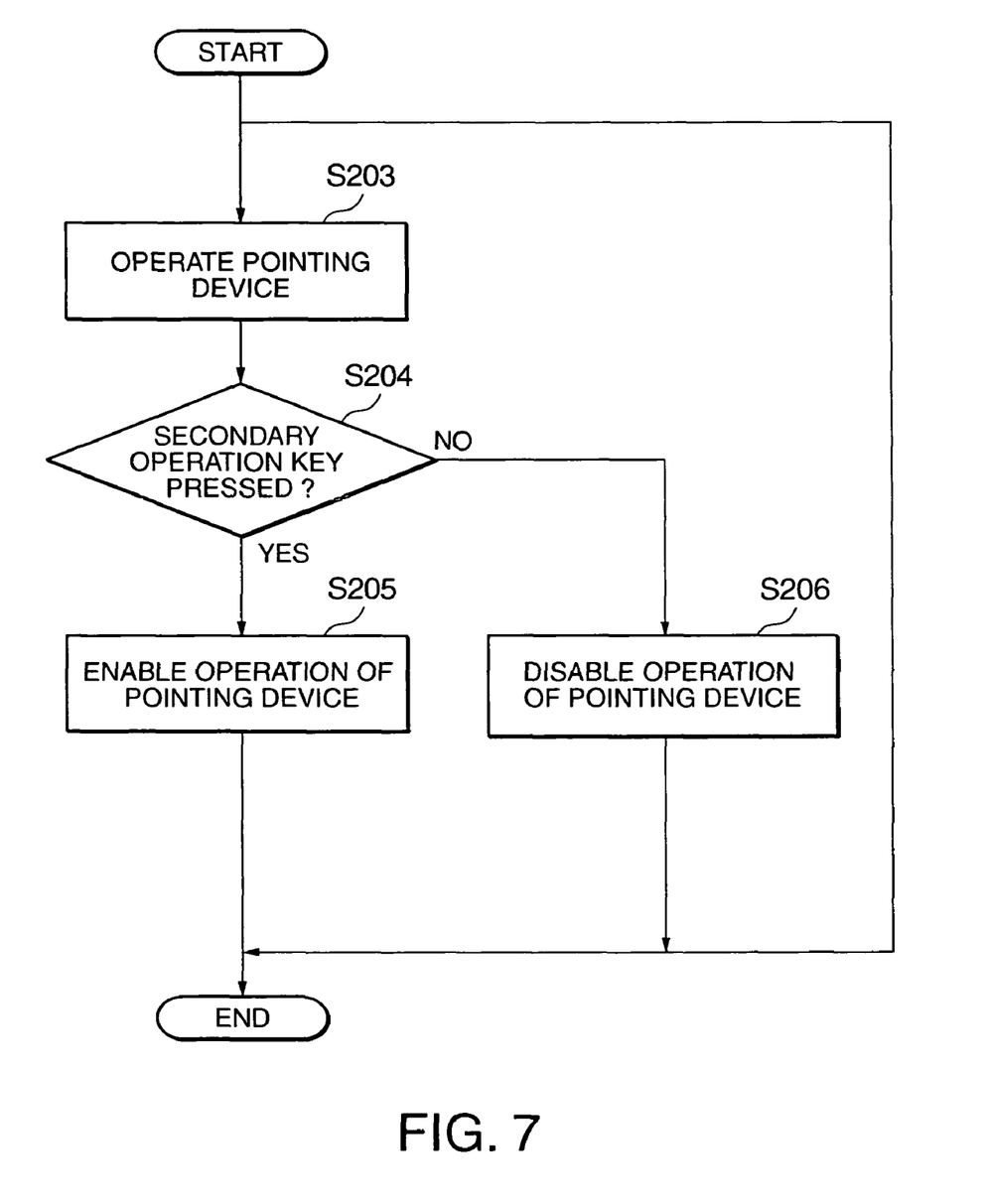
FIG. 7 is a flowchart showing another example of the operation of the mobile terminal according to the present invention.

In FIG. 7, when the control unit 105 detects the inputting operation of the secondary operation key 104 and the pointing device 320, the control unit 105 can enable or disable the operation of the pointing device. The control unit 105 detects the operation of the pointing device 320 (S203), and simultaneously detects the presence/absence of the operation of the key 104 (S204). When the secondary operation key 104 is operated (YES in S204), the control unit 105 enables the operation of the pointing device 320 (S205). When the key 104 is not operated (NO in S204), the control unit 105 disables the operation of the pointing device 320 (S205). An erroneous inputting operation of the pointing device 320 can be prevented.

Figure 8:
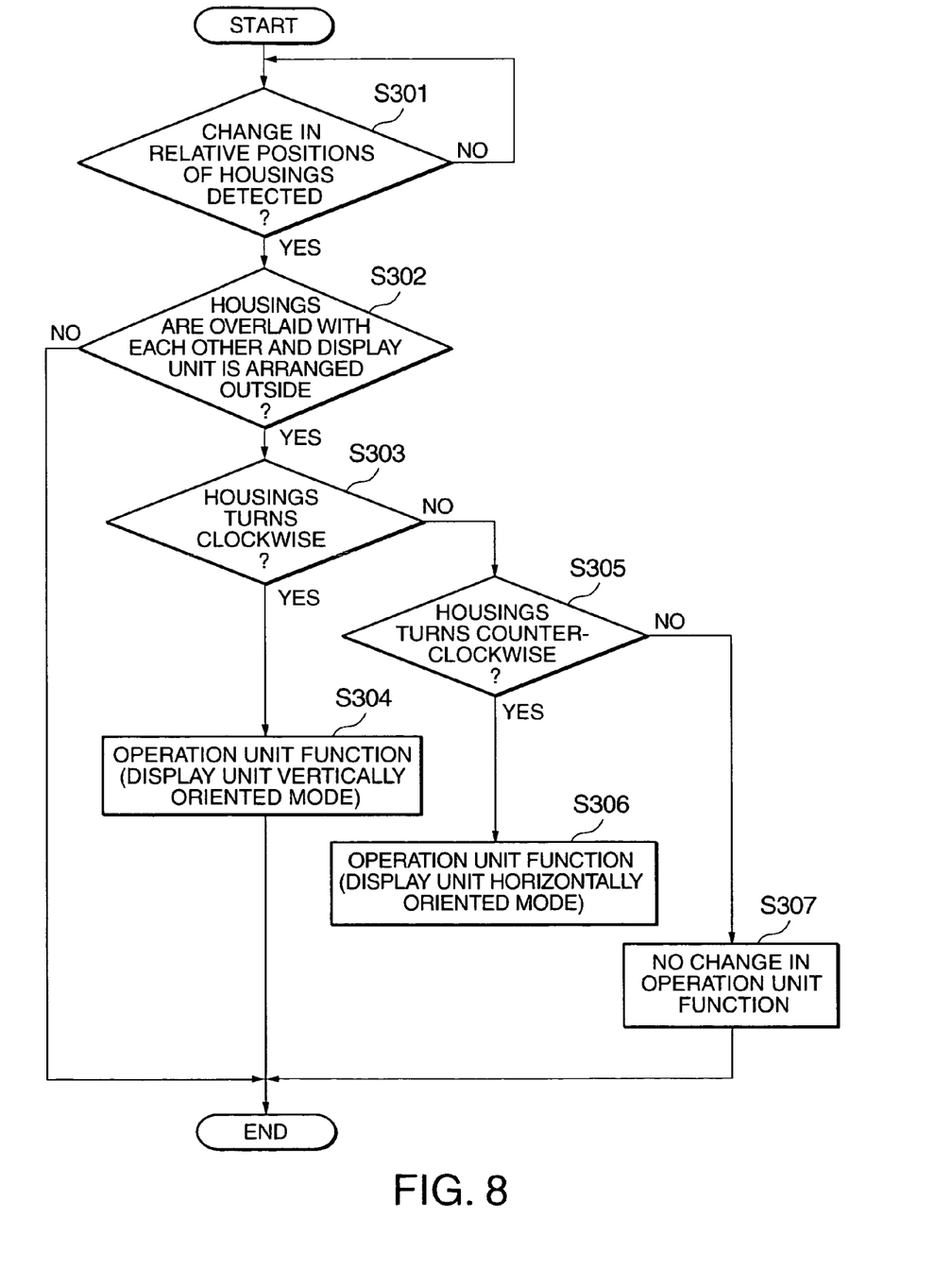
FIG. 8 is a flowchart showing another example of the operation of the mobile terminal according to the present invention.

In FIG. 8, the control unit 105 can detect the displacement direction (for example, the rotation direction) of the upper housing 200 and the lower housing 100 and can set the function of the pointing device. The control unit 105 detects the relative position of the housings (S301). The control unit 105 detects that the housings are overlaid with each other, and the display unit 202 is arranged outside of the telephone (YES in S302). At this time, if the upper housing 200 turns clockwise and is overlaid on the lower housing 100 (YES in S303), then the control unit 105 changes the display unit 202 into the vertically oriented screen and changes the function of the pointing device 320 (S304). If the upper housing 200 turns counterclockwise and is overlaid on the lower housing 100 (YES in S305), then the control unit 105 changes the display unit 202 into the horizontally oriented screen and changes the function of the pointing device 320 (S306). When the upper housing 200 turns otherwise, the control unit 105 does not change the function of the pointing device 320 (S307). In the case above, the browsing mode is set on the vertically oriented screen. The pointing device is used in switching the page of the displayed information. The contents playback mode (for example, the digital terrestrial receive mode) is set on the horizontally oriented screen. The pointing device 320 has the function of as the operator for adjusting the quality of an image and voice of the contents to be played back.

The control unit 105 can provides functions for a specific operation for the pointing device 320. For example, during transmitting, a user can operate the pointing device to start communications, or control the calling tone. Furthermore, the user can operate the pointing device 320 to function or release the hinge lock unit 310.

A physical value detection device (for example, a personal authentication sensor, etc.) can be arranged at the end portion of the 2-axis hinge unit. As an example of the sensor, a fingerprint recognition device can be mounted. According to the input information into the fingerprint recognition device, the hinge lock unit 310 can be controlled. Inputting a fingerprint recorded in advance can activate or release the hinge lock unit 310. The control unit 105 can request inputting a fingerprint and simultaneously performing other key operation. When a fingerprint recorded in advance is input, the control unit 105 can use the terminal. The above-mentioned control can protect the mobile telephone against an unauthorized use.

With the folding mobile terminal according to the present invention, for example, a pointing device can be mounted at the end portion of the 2-axis hinge unit which is constantly exposed outside, thereby realizing a smaller terminal.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile terminal, comprising:
   a control unit;
   a display unit;
   an upper housing including a through cutting in an edge portion;
   a lower housing;
   a 2-axis hinge unit coupling the housings for folding and swinging movement of the upper housing relative to the lower housing about intersecting axes, one of which is arranged in the lower housing and the other of which is arranged in the upper housing; and
   a position detection means for detecting relative positions between the upper housing and the lower housing,
   wherein a top face of the one of the axes is exposed outside the terminal for viewing due to arranging the one of the axes in the through cutting of the upper housing in all positions of the upper housing, and an information input device is mounted in the top face of one of the axes;
   the information input device is a pointing device,
   upon the position detection means detecting the housings being overlaid with the display unit facing outside, the control unit assigns a predetermined function to the information input device and the control unit enables an inputting operation of the information input device.

2. The terminal according to claim 1, wherein the control unit assigns another operating function to the pointing device.

3. The terminal according to claim 1, wherein the information input device further comprises a terminal operating function.

4. The terminal according to claim 3, wherein the terminal operating function is performed by a press.

5. The terminal according to claim 1, wherein the information input device is a fingerprint sensor.

6. The terminal according to claim 5, wherein the control unit can operate the terminal when the fingerprint sensor detects a predetermined input.

7. The terminal according to claim 1, wherein the control unit controls the terminal based on an output of the position detection means.

8. The terminal according to claim 7, wherein the control unit controls an operation of the information input device.

9. The terminal according to claim 1, wherein the position detection means comprise a magnet and a magnetic sensor.

10. The terminal according to claim 9, wherein the magnet and the magnetic sensor are arranged in separate housings.

11. The terminal according to claim 9, wherein the magnetic sensor is a Hall element.

12. The terminal according to claim 1, wherein the position detection means detect a turning direction of the housings.

13. The terminal according to claim 12, wherein the control unit controls the display unit based on the turning direction of the housings.

14. The terminal according to claim 1, wherein the control unit detects an operation of a predetermined operation key to control an operation of the information input device.

15. The terminal according to claim 14, wherein the control unit controls an operation of the information input device while a predetermined operation key is operated.

16. The terminal according to claim 1, comprising a lock unit for locking said 2-axis hinge unit.

17. The terminal according to claim 16, wherein the lock unit is controlled by an input from the information input device.

18. The terminal according to claim 17, wherein the information input device is a personal authentication sensor; and the lock unit is released when the sensor detects a predetermined input.

19. The terminal according to claim 18, wherein the personal authentication sensor is a fingerprint sensor.

20. The terminal according to claim 1, wherein the terminal is a mobile telephone.

21. The mobile terminal of claim 1, wherein the two axes of the 2-axis hinge unit are a folding axis and a horizontal rotation axis, and the one of the axes is the horizontal rotation axis.

22. A mobile terminal, comprising:
   a control unit;
   a display unit;
   an upper housing including a through cutting in an edge portion;
   a lower housing;
   a 2-axis hinge unit coupling the housings and having an open and close rotation axis and a horizontal rotation axis which is in the through cutting of the upper housing in all positions of the upper housing;

an information input device being mounted in a top face of the horizontal rotation axis; and a position detection means for detecting relative positions between the upper housing and the lower housing, wherein, upon the position detection means detecting the housings being overlaid with the display unit facing outside, the control unit assigns a predetermined function to the information input device and the control unit enables an inputting operation of the information input device.

23. The mobile terminal according to claim 22, wherein a lower portion of the horizontal rotation axis is in the lower housing and an upper portion is in the through cutting of the upper housing.

24. A mobile terminal, comprising:

a display;

a controller;

a lower housing;

an upper housing, a through cutting in an edge portion;

a pointing device;

a 2-axis hinge unit coupling the lower and the upper housing allowing faces of the upper housing and lower housing to open and close against each other and to have the upper housing and lower housing rotate relative to each other around an axis created by the pointing device in the 2-axis hinge unit, the pointing device exposed to an operator in any position of the upper housing and lower housing relative to each other; and a position detection means for detecting relative positions between the upper housing and the lower housing, wherein, upon the position detection means detecting the housings being overlaid with the display unit facing outside, the control unit assigns a predetermined function to the information input device and the control unit enables an inputting operation of the information input device.

* * * * *